(12) United States Patent
Clausi et al.

(10) Patent No.: US 11,097,358 B2
(45) Date of Patent: Aug. 24, 2021

(54) CORE DRILL BIT

(71) Applicant: Hilti Aktiengesellschaft, Schaan (LI)

(72) Inventors: Donato Clausi, Buchs (CH); Manuel Gut, Goefis (AT); Marco Balter, Feldkirch (AT); Thomas Kinkeldei, Munich (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 16/335,113

(22) PCT Filed: Sep. 21, 2017

(86) PCT No.: PCT/EP2017/073863
§ 371 (c)(1),
(2) Date: Mar. 20, 2019

(87) PCT Pub. No.: WO2018/055018
PCT Pub. Date: Mar. 29, 2018

(65) Prior Publication Data
US 2019/0232393 A1     Aug. 1, 2019

(30) Foreign Application Priority Data
Sep. 23, 2016 (EP) .................................. 16190257

(51) Int. Cl.
*B23B 51/04* (2006.01)
*B28D 1/04* (2006.01)
*B28D 7/00* (2006.01)

(52) U.S. Cl.
CPC .......... *B23B 51/0406* (2013.01); *B28D 1/041* (2013.01); *B28D 7/005* (2013.01); *B23B 2270/32* (2013.01); *B23B 2270/36* (2013.01)

(58) Field of Classification Search
CPC ... B23B 51/04; B23B 51/0406; B23B 51/042; B23B 51/0473; B23B 2251/02;
(Continued)

(56) References Cited

U.S. PATENT DOCUMENTS 2,599,770 A * 6/1952 Marcerou ............ B23D 59/025
408/59
3,898,880 A   8/1975 Kelseaux et al.
(Continued)

FOREIGN PATENT DOCUMENTS

CN   1424788 A    6/2006
CN   101080304 A  11/2007
(Continued)

OTHER PUBLICATIONS

Constantine A. Balanis. 2008. Modern Antenna Handbook, pp. 106-111. Hoboken, NJ: Wiley-Interscience. http://search.ebscohost.com/login.aspx?direct=true&db=nlebk&AN=246485&site=eds-live&scope=site. (Year: 2008).*

(Continued)

*Primary Examiner* — Chwen-Wei Su
(74) *Attorney, Agent, or Firm* — Davidson, Davidson & Kappel, LLC

(57) ABSTRACT

A core drill bit 1 includes a tubular shaft 12, a mounting platform 34 provided on a proximal end of the tubular shaft 12 for mounting the core drill bit on a power tool 35, and an annular cutting section 2 provided with abrasive cutting segments 3 arranged at a distal end of the tubular shaft 12. The core drill bit 1 further includes a transponder 24 and a slit 27 in the tubular shaft 12. The slit 27 forms a slit antenna 26 for the transponder 24.

20 Claims, 2 Drawing Sheets

(58) Field of Classification Search
CPC ............... B23B 25/06; B23B 2270/48; B23B 2270/483; B23B 2270/486; B23B 2270/32; B23B 2270/36; B28D 1/041; B28D 1/146; B28D 7/005; E21B 10/62; Y10T 408/895; Y10T 408/8957; Y10T 408/896

See application file for complete search history.

(56) References Cited

U.S. PATENT DOCUMENTS

| | | | |
|---|---|---|---|
| 5,082,070 A * | 1/1992 | Obermeier | B28D 1/041 |
| | | | 175/403 |
| 5,212,495 A | 5/1993 | Winkel et al. | |
| 5,316,416 A * | 5/1994 | Kim | B24D 7/18 |
| | | | 408/145 |
| 5,400,861 A | 3/1995 | Sheirer | |
| 6,788,066 B2 * | 9/2004 | Wisler | E21B 25/00 |
| | | | 324/376 |
| 7,210,878 B2 | 5/2007 | Koslowsld et al. | |
| 7,740,425 B2 | 6/2010 | Zeiler et al. | |
| 8,174,265 B2 | 5/2012 | Bittar et al. | |
| 8,316,742 B2 | 11/2012 | Craig et al. | |
| 9,322,216 B2 | 4/2016 | Chan et al. | |
| 9,498,827 B2 | 11/2016 | Otter et al. | |
| 10,065,252 B2 * | 9/2018 | Hoop | B23B 51/0473 |
| 2001/0052416 A1 | 12/2001 | Wissmach et al. | |
| 2002/0167418 A1 | 11/2002 | Goswami et al. | |
| 2003/0156033 A1 * | 8/2003 | Savage | G06K 19/04 |
| | | | 340/572.8 |
| 2012/0183366 A1 * | 7/2012 | Stenman | B23Q 11/0071 |
| | | | 408/1 BD |
| 2014/0140781 A1 * | 5/2014 | Sjoo | B23F 21/146 |
| | | | 408/8 |
| 2014/0253131 A1 | 9/2014 | Liu et al. | |
| 2016/0161628 A1 | 6/2016 | Bittar et al. | |
| 2016/0217364 A1 | 7/2016 | Ronneberger et al. | |
| 2017/0216935 A1 * | 8/2017 | Baratta | B27B 5/30 |
| 2017/0274489 A1 | 9/2017 | Baratta | |

FOREIGN PATENT DOCUMENTS

| | | | |
|---|---|---|---|
| CN | 101467070 A | 6/2009 | |
| CN | 101896313 A | 11/2010 | |
| CN | 202690031 U | 1/2013 | |
| CN | 103061755 A | 4/2013 | |
| CN | 204818257 U | 12/2015 | |
| CN | 105934299 A | 9/2016 | |
| CN | 105952406 A | 9/2016 | |
| EP | 2 886 230 A1 | 6/2015 | |
| EP | 2440735 B1 | 10/2018 | |
| JP | H0349852 A | 3/1991 | |
| JP | 2002026637 A | 1/2002 | |
| JP | 2002 059377 A | 2/2002 | |
| JP | 2003014867 | 1/2003 | |
| JP | 2003227122 A | 8/2003 | |
| JP | 2003305717 A | 10/2003 | |
| JP | 2004 261950 | 9/2004 | |
| JP | 2011 218487 | 11/2011 | |
| JP | 2014104578 | 6/2014 | |
| RU | 2553697 C2 | 12/2014 | |
| SU | 926223 A2 | 5/1982 | |
| WO | WO2006/009155 | 1/2006 | |
| WO | WO2006/066259 | 6/2006 | |
| WO | WO 2010111352 A2 | 9/2010 | |
| WO | WO 2015036519 | 3/2015 | |
| WO | WO-2015091601 A1 * | 6/2015 | ......... B23B 51/0466 |
| WO | WO2016/025963 | 2/2016 | |
| WO | WO 2016114784 | 7/2016 | |

OTHER PUBLICATIONS

International Search Report of PCT/EP2017/073863, dated Jan. 17, 2018.

* cited by examiner

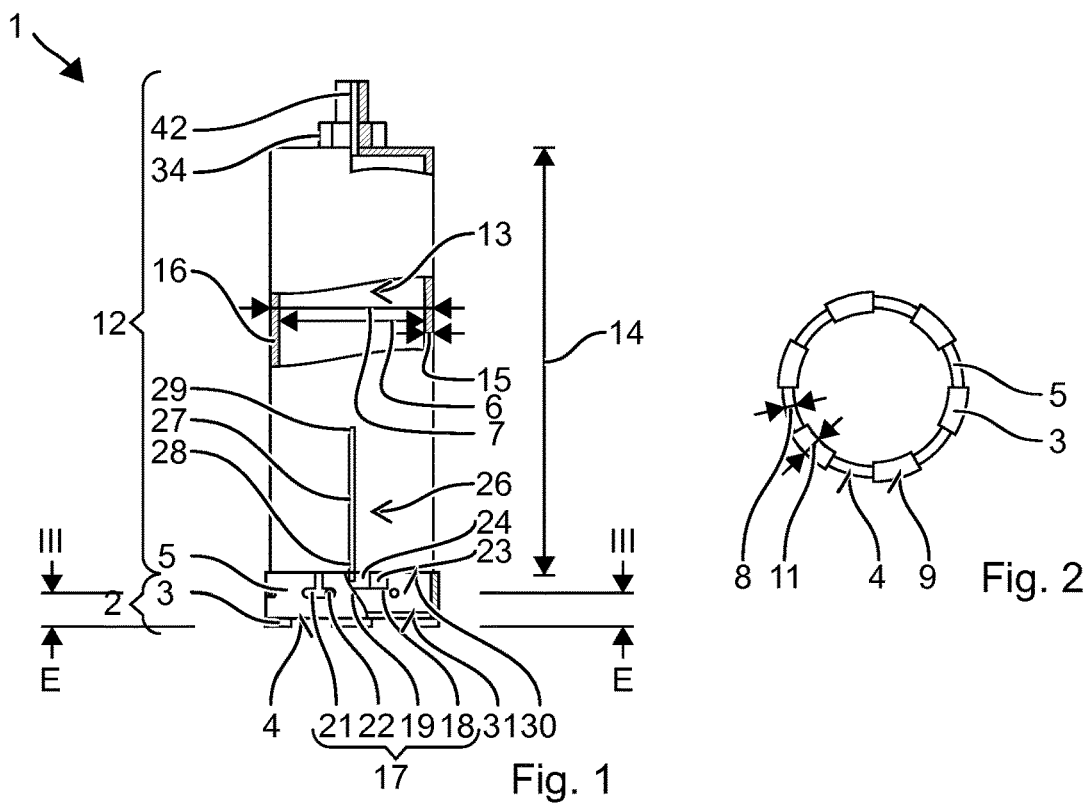
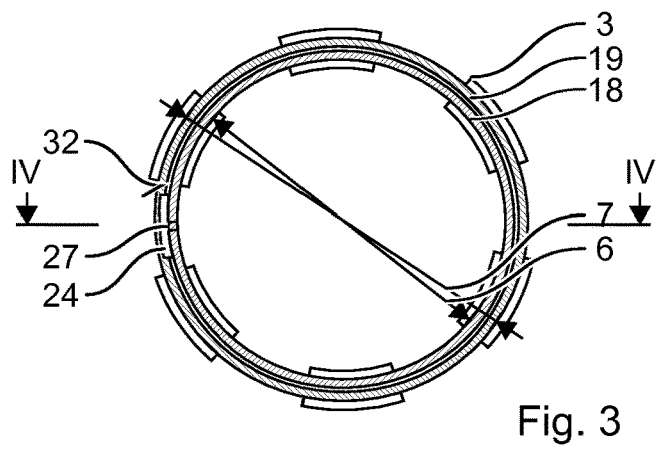
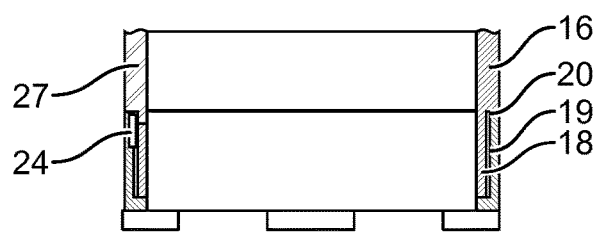

CORE DRILL BIT

The present invention relates to a core drill bit with abrasive cutting segments.

BACKGROUND

A machine tool operating a core drill bit is described in U.S. Pat. No. 7,210,878. The core drill bit has an identification means on its side proximal to the machine tool. The machine tool can read the identifications means for setting optimum torque/speed-pairings.

A core drill bit with abrasive cutting segments is described in EP 2 886 230 A1. The core drill bit has a tubular shaft and a releasably mounted annular cutting section with abrasive cutting segments.

SUMMARY OF THE INVENTION

The present invention provides a core drill bit including a tubular shaft, a mounting platform provided on a proximal end of the tubular shaft for mounting the core drill bit on a power tool, and an annular cutting section provided with abrasive cutting segments arranged at a distal end of the tubular shaft. The core drill bit further comprises a transponder and a slit in the tubular shaft. The slit forms a slit antenna for the transponder.

The core drill bit is mainly a steel body shielding radio signals. A communication of the transponder with an interrogating unit is therefore inefficient. The transponder may be mounted on the outside of tubular shaft as in U.S. Pat. No. 7,210,878 and hence in sight of the interrogating unit. However, this transponder may be damaged under the rough working conditions.

The inventive core drill bit has a slit antenna which increases signal strength. The slit antenna is robust. The transponder can be tucked away at a location in contact or in close proximity with the antenna. One end of the slit is preferably in contact with the transponder.

In a preferred embodiment, the slit is filled with a non-metallic material. The receiving room of the tubular shaft is closed such it can be flushed with water for cooling the abrasive cutting elements.

In a preferred embodiment, the tubular shaft is made of steel. The non-metallic slit or insert in the metallic shaft forms an antenna.

In a preferred embodiment, the transponder is responsive to radio signals and a length of the slit corresponds to quarter or half of the wavelength of these radio signals. The antenna is matched to transponder which is preferably responsive to a single carrier frequency only. A carrier frequency of the radio signals can be in the range of 0.4 Ghz to 5.0 GHz. Lower frequencies and higher frequencies lead to significantly higher signal losses.

In a preferred embodiment, the transponder is a passive transponder and its carrier frequency is in the range of 0.8 GHz and 1.0 Ghz. The transponder has no own power supply and allows for a higher miniaturization. The frequency band is optimal for signal to noise ratio.

In an embodiment, the transponder is attached to the annular cutting section. The annular cutting section can be releasably mounted on the tubular shaft. Each annular cutting section can be equipped with a transponder. Thus, a change of the annular cutting section can be identified.

In an embodiment, the tubular shaft has an inner sleeve and the annular cutting section has an outer sleeve which circumferentially covers the inner sleeve. The transponder is attached to the outer sleeve and the transponder faces the inner sleeve. The transponder is pocketed between the two sleeves and protected against the environment. An end of the slit is preferably at the inner sleeve such to connect the transponder. The transponder may be encapsulated in a non-metallic material for mechanical stability, e.g. an epoxy resin.

In a preferred embodiment, the mounting platform has a water inlet open to the receiving room of the tubular shaft. The abrasive cutting segments require for a coolant. A cooling with flushing water is reliable and efficient. The easiest way to guide the water to the cutting area is by injecting the water into the receiving room of the tubular shaft.

In a preferred embodiment, the transponder has a data storage having stored data including one or more of unique identifier for the annular cutting section, type identifier for the annular cutting section, height of unused abrasive cutting segments, operating parameters of the core drill bit.

BRIEF DESCRIPTION OF THE DRAWINGS

Exemplary embodiments of the present invention are described below with reference to the drawings. The drawings do not necessarily illustrate the exemplary embodiments to scale, but, rather, are depicted in schematic and/or slightly distorted form when this is useful for the explanation. With respect to additions to the teaching which are directly apparent from the drawings, reference is made to the relevant related art. In this regard it is noted that a variety of modifications and alterations regarding the form and the detail of a specific embodiment may be made without departing from the general concept of the present invention. The features of the present invention disclosed in the description, the drawings, and the claims may be important to the refinement of the present invention, taken alone as well as in any given combination.

In addition, any combination composed of at least two of the features disclosed in the description, the drawings, and/or the claims fall within the scope of the present invention. The general concept of the present invention is not limited to the exact form or the detail of the preferred specific embodiment illustrated and described below or is not limited to a subject matter which would be delimited in comparison to the subject matter claimed in the claims. For given dimension ranges, values within the stated limits are also intended to be disclosed as limiting values, and may be used and claimed as desired. For the sake of simplicity, the same reference numerals are used below for identical or similar parts or parts having an identical or similar function.

Figure 5:
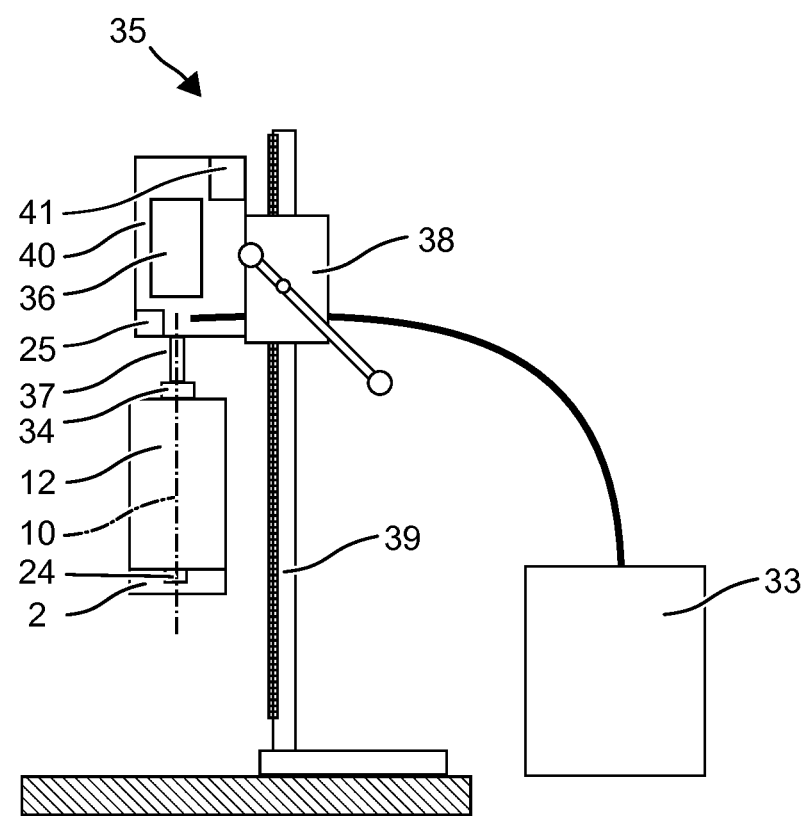

The terms proximal and distal are used to indicate the relative position along an axis with respect to a tool machine as point of reference. Proximal has the meaning of closer to the tool machine; distal has the meaning of more distant to the tool machine.

FIG. 1 a drill bit having an exchangeable cutting section

FIG. 2 a view from the bottom

FIG. 3 a cross-section in the plane

FIG. 4 a cross-section in the plane IV-IV

FIG. 5 the drill bit mounted to a machine tool

DETAILED DESCRIPTION

Referring to the drawings, and initially to 0, there is shown a core drill bit 1 made in accordance with the invention. The core drill bit 1 is intended to make circular holes in walls, ceilings or similar structures made of concrete or other mineral materials. The core drill bit 1 demolishes the structure by grinding a ring-shaped hole leaving intact an inner cylindrical core.

The core drill bit 1 has annular cutting section 2 with one or several abrasive cutting segments 3 fixed to a distal abutting face 4 of a supportive body 5. The supportive body 5 is preferably a short and thin-walled cylindrical tube. A wall thickness of the supportive body 5 is significantly smaller than inner diameter 6 and outer diameter 7 of the supportive body 5. The wall thickness 8 is in the range of few millimeters; the diameters are larger than 2 cm, e.g. larger than 5 cm. The distal abutting face 4 is a circular ring of dimensions corresponding to the wall thickness and diameters. The abrasive cutting segments 3 are fixed to the distal abutting face 4 of the supportive body 5. Thus, the abrasive cutting segments 3 are arranged along the circumference of a circular ring.

A facet distal to the supportive body 5 is the active facet 9 which grinds the mineral structure. The active facet 9 is flat. The plane defined by the facet 9 is perpendicular to the longitudinal axis 10 of the core drill bit 1. The active facets 9 of all abrasive cuttings segments 3 are arranged in the same plane E. The active facets 9 may be curved within the plane E to match the curvature of the circular ring or shaped in order to optimize the grinding process. The abrasive cutting segments 3 may have a prismatic body shape. The thickness 11, i.e. radial dimension, of the abrasive cutting segments 3 is preferably by a margin larger than the wall thickness 8 of the supporting body 5. The supportive body 5 can emerge into the annular hole grinded by the abrasive cutting segments 3 without touching walls of the hole. The margin may be less than 5 mm, e.g. less than 2 mm.

The abrasive cutting segments 3 are preferably made of composite materials comprising very hard particles like diamond, synthetic diamond, and polycrystalline diamond embedded in a supporting matrix made of metal or ceramics. The hard particles have diameters in the sub-millimetre range up to a few millimetres. The hard particles may be arranged randomly or arranged in layers within the supporting matrix. The supporting matrix is worn of consecutively exposing fresh hard particles during use of the core drill bit 1. The annular cutting section 2 can hence be used until the abrasive cutting segments 3 are worn off entirely.

The annular cutting section 2 is preferably releasably mounted to a tubular shaft 12. The tubular shaft 12 has a cylindrical receiving room 13 of a height 14. The radial dimensions of the tubular shaft 12 are identical or almost identical to the radial dimensions of the annular cutting section 2. The tubular shaft 12 basically just extends the annular cutting section 2 along the longitudinal axis 10 and allows cutting holes as deep as the height 14 of the tubular shaft 12. The tubular shaft 12 requires being sturdy and therefore is preferably made from steel. A thickness 15 of its wall 16 of the tubular shaft 12 is chosen to sustain the pressure along the longitudinal axis 10 and the torque around the longitudinal axis 10. The wall thickness 15 of the tubular shaft 12 may be identical or almost identical to the wall thickness 15 of the annular cutting section 2. An inner diameter 6 and an outer diameter 7 of the annular cutting section 2 and the tubular shaft 12 are identical or almost identical. The wall thickness 15 is by a margin smaller than the thickness 11 of the abrasive cutting segments 3.

The annular cutting section 2 can preferably be mounted on and dismounted from the tubular shaft 12 such to be replaced by a new annular cutting section 2. A mechanical fastener mechanism 17 engages in a form fitting manner the annular cutting section 2 with the tubular shaft 12. The exemplary mechanical fastener mechanism 17 is based on a flanged bushing. The annular cutting section 2 is provided with an outer sleeve 18 at its proximal end. The tubular shaft 12 is provided with an inner sleeve 19 at its distal end. The inner sleeve 19 fits tightly into the outer sleeve 18. 0 shows just for illustrative purpose the outer sleeve 18 partly cut away such that the underlying inner sleeve 19 is visible. The inner sleeve and the outer sleeve are preferably cylindrical. An outer diameter of the inner sleeve 19 is about equal to the inner diameter of the outer sleeve 18. The outer sleeve 18 abuts along the longitudinal axis 10 against a flange or shoulder 20 formed by the wall 16 of the tubular shaft 12. The inner sleeve 19 may equally abut against a shoulder formed by the supporting body 5, respectively. The inner sleeve 19 may be formed from the wall 16 by recessing the outer diameter. The inner diameter of the inner sleeve 19 and the wall 16 can be identical, and are in preference identical with the inner diameter of the annular cutting section 2. The outer sleeve 18 may be formed by recessing the supporting body 5 such to increase the inner diameter. The outer diameter may be left unchanged and identical to the supporting body 5 and in preference identical to the tubular shaft 12.

The mechanical fastener mechanism 17 can be provided with a bayonet-like lock. The bayonet-like lock is based on curved or tilted cams 21 open to one end into which pins 22 are engaged. In a portion close to the open end, the cams 21 guide the pins 22 predominantly along the longitudinal axis 10. In a further portion, the cams 21 guide the pins 22 predominantly around the longitudinal axis 10. The alteration of the initial longitudinal guidance and subsection rotational guidance secures the annular cutting section 2 against a disconnection along the longitudinal axis 10. The cams 21 can be implemented as slits or grooves. The illustrated example has the cams 21 on the outer sleeve 18 and the pins 22 on the inner sleeve 19. Different mechanical fastener mechanism are known, e.g. from EP 2 886 230 A1, which can be used to lock the annual cutting section 2.

The annular cutting section 2 is equipped with readable data storage 23. The readable data storage 23 may be read-only. The read-only data contains information about the cutting section 2. The data may be descriptive about the cutting section, e.g. height of the abrasive cutting segments before first use, number and dimensions of the abrasive cutting segments, material composition of the abrasive cutting segments, and diameter of the cutting section. The data may contain or be descriptive about optimal operation conditions or limiting operation conditions, e.g. optimal pressure, optimal rotational speed, optimal water flushing, maximum pressure, maximum rotational speed, minimal water flushing. The data may contain a type identifier of the annular cutting section. The type identifier is a sufficient pointer to look up data descriptive about the cutting section 2 or data descriptive about operation conditions for the cutting section in a separate lookup list. The data may contain an identifier unique for each cutting section 2. The unique identifier allows determining if the cutting section 2 has been replaced by any other cutting section, even by the same type. The readable data storage 23 may be read-only or allow for writing data. The writable data may include data about the last use, e.g. duration of use, applied torque and pressure, used tool machines.

The annular cutting section 2 has a transponder 24 connected with the data storage 23. The transponder 24 can read the data from the data storage and can transmit the data via a radio signal. A interrogating unit 25 sends a request via a radio signal to the transponder 24. The transponder 24 responds to the request by reading the data from the data storage and transmitting the data via the radio signal. The radio signals have a carrier frequency preferably higher than 0.4 Ghz (Gigahertz), e.g. higher than 0.8 GHz, and less than 5.0 Ghz, preferably less than 2.0 Ghz, e.g. less than 1.0 Ghz.

The transponder 24 is preferably a passive transponder. The annular cutting section 2 has no power source for powering the transponder 24 and the data storage 23. The transponder 24 is powered by the radio signal emitted by a interrogating unit 25. Transponder 24 may have a capacitive power buffer collecting some energy from the radio signal sufficient for reading the data and transmitting the data. The transponder 24 and the data storage 23 may be an integrated unit. The integrated unit may be for instance an RFID device (radio-frequency identification). In particular, an RFID device being responsive to radio signals in one of the industrial, scientific and medical (ISM) radio bands.

The tubular shaft 12 has an antenna 26 connected to the transponder 24. The antenna 26 increases the efficiency of the radio communication by an improved coupling of the radio signals with the transponder 24. The antenna 26 is formed as a slit 27 in the metallic body of the tubular shaft 12. The slit 27 has a length equaling either a quarter of the wavelength of the carrier frequency or half of the wavelength of the carrier frequency. The slit 27 has distal end 28 and a proximal end 29. The distal end 28 is located in the inner sleeve 18 or at the proximal rim 30 of the inner sleeve 18. The distal end 28 is open for the quarter wave length slot. Preferably, the distal end 28 is closed whereby the inner sleeve 18 is circumferentially closed along its distal rim 31. The slit 27 may be a straight line. The slit 27 may be parallel or inclined with respect to the longitudinal axis 10. The slit 27 fully penetrates the tubular shaft 12, i.e. the radial dimension or depth of the slit 27 equals the wall thickness 15 of the tubular shaft 12.

The transponder 24 is attached to the outer sleeve 18 adjacent to the distal end 28 of the slit 27. The slit 27 may partly overlap with the transponder 24 along the longitudinal axis 10 or the slit 27 just reaches until to the transponder 24. Preferably, the transponder 24 is attached to the inner side 32 of the outer sleeve 18 such that the transponder 24 is at least partly encapsulated between the inner sleeve 19 and the other sleeve 18. The inner side 32 may be recessed to form a pocket for the transponder 24.

The slit 27 is filled with a non-metallic filling, e.g. a polymeric material. The filling inhibits flushing water to exit by the slit 27. The length of the slit 27 is compensated for the dielectric properties of the non-metallic filling to match the quarter wavelength or half wavelength or the radio signals in this non-metallic filling.

The core drill bit 1 has a mounting platform 34 for mounting to a machine tool 35. The mounting platform 34 may comprise a gear wheel for transmitting torque to the core drill bit 1. The machine tool 35 provides for torque around a longitudinal axis 10 and for pressure along the longitudinal axis 10. An illustrative machine tool 35 has a rotary drive unit 36 driving a spindle 37. The mounting platform 34 can be releasably mounted to the spindle 37. Albeit smaller core drill bits 1 can operated by a hand help machine tool 35, larger core drill bits 1 require for a rig 38 to sustain torque and pressure. The rig 38 has a lifting structure 39 for raising and lowering the core drill bit 1 along the longitudinal axis 10. For instance, the lifting structure 39 is based on a rack and pinion lifting a housing 40 of the rotary drive unit 36 and the spindle 37. The lifting structure 39 can be manually operated or automatically operated. An operating unit 41 of the machine tool 35 can monitor or control the pressure applied to the core drill bit 1 along the longitudinal axis 10.

The mounting platform 34 has a water inlet 42 for flushing the abrasive cutting segments 3 with water. The water inlet 42 is preferably arranged on the longitudinal axis 10 and extends into the receiving room 13. A water supply 33 can be connected to the water inlet 42. The water supply 33 can be controlled by the operation unit 41.

The invention claimed is:

1. A core drill bit comprising:
   a tubular shaft;
   a mounting platform provided on a proximal end of the tubular shaft for mounting the core drill bit on a power tool;
   an annular cutting section provided with abrasive cutting segments arranged at a distal end of the tubular shaft;
   a transponder;
   a slit in the tubular shaft, the slit forming a slit antenna for the transponder.

2. The core drill bit as recited in claim 1 wherein the slit is filled with a non-metallic material.

3. The core drill bit as recited in claim 1 wherein the tubular shaft is made of steel.

4. The core drill bit as recited in claim 1 wherein the transponder is responsive to radio signals and a length of the slit corresponds to quarter or half of the wavelength of these radio signals.

5. The core drill bit as recited in claim 4 wherein a carrier frequency of the radio signals is in the range of 0.4 Ghz to 5.0 GHz.

6. The core drill bit as recited in claim 1 wherein the transponder is a passive transponder with a carrier frequency in a range of 0.8 GHz and 1.0 Ghz.

7. The core drill bit as recited in claim 1 wherein one end of the slit is in contact or close proximity with the transponder.

8. The core drill bit as recited in claim 1 wherein the transponder is attached to the annular cutting section.

9. The core drill bit as recited in claim 1 wherein the annular cutting section is releasably mounted to the tubular shaft.

10. The core drill bit as recited in claim 9 wherein the tubular shaft has an inner sleeve and the annular cutting section has an outer sleeve circumferentially covering the inner sleeve, the transponder being attached to the outer sleeve and facing the inner sleeve.

11. The core drill bit as recited in claim 10 wherein an end of the slit is at the inner sleeve.

12. The core drill bit as recited in claim 1 wherein the mounting platform has a water inlet open to a receiving room of the tubular shaft.

13. The core drill bit as recited in claim 1 wherein the transponder has a data storage having stored data including one or more of a unique identifier for the annular cutting section, a type identifier for the annular cutting section, a height of unused abrasive cutting segments, and operating parameters of the core drill bit.

14. The core drill bit as recited in claim 1 wherein the transponder is responsive to radio signals.

15. The core drill bit as recited in claim 14 where a length of the slit is a function of a wavelength of the radio signals.

16. The core drill bit as recited in claim 1 wherein the length of slit is matched to a characteristic of the transponder.

17. The core drill bit as recited in claim 1 wherein the transponder is a passive transponder.

18. The core drill bit as recited in claim 1 wherein the slit has a proximal end and a distal end, the distal end being open.

19. The core drill bit as recited in claim 1 wherein the slit fully penetrates the tubular shaft.

20. The core drill bit as recited in claim 1 wherein the slit is a straight line.

* * * * *